United States Patent
Chou et al.

(10) Patent No.: US 8,942,189 B2
(45) Date of Patent: Jan. 27, 2015

(54) APPARATUS AND METHOD FOR ENABLING COMMUNICATIONS AMONG UNSYNCHRONIZED WIRELESS DEVICES

(75) Inventors: Chun-Ting Chou, Taipei (TW); Richard Chen, Croton-On-Hudson, NY (US)

(73) Assignee: Koninklijke Philips N.V., Eindhoven (NL)

( * ) Notice: Subject to any disclaimer, the term of this patent is extended or adjusted under 35 U.S.C. 154(b) by 563 days.

(21) Appl. No.: 12/677,526

(22) PCT Filed: Sep. 12, 2008

(86) PCT No.: PCT/IB2008/053696
§ 371 (c)(1),
(2), (4) Date: Mar. 11, 2010

(87) PCT Pub. No.: WO2009/034550
PCT Pub. Date: Mar. 19, 2009

(65) Prior Publication Data
US 2010/0172338 A1    Jul. 8, 2010

Related U.S. Application Data

(60) Provisional application No. 61/013,334, filed on Dec. 13, 2007, provisional application No. 60/972,435, filed on Sep. 14, 2007.

(51) Int. Cl.
| | |
|---|---|
| *H04W 4/00* | (2009.01) |
| *H04W 56/00* | (2009.01) |
| H04W 76/04 | (2009.01) |
| *H04W 84/18* | (2009.01) |
| *H04W 52/02* | (2009.01) |

(52) U.S. Cl.
CPC .......... *H04W 56/002* (2013.01); *H04W 76/046* (2013.01); *H04W 84/18* (2013.01); *H04W 52/0216* (2013.01)

USPC ........................................................ 370/329

(58) Field of Classification Search
None
See application file for complete search history.

(56) References Cited

U.S. PATENT DOCUMENTS

| | | | |
|---|---|---|---|
| 5,020,056 A | 5/1991 | Chennakeshu | |
| 5,535,207 A * | 7/1996 | Dupont | 370/433 |
| 2002/0150145 A1 | 10/2002 | Alriksson | |
| 2004/0258029 A1* | 12/2004 | Beard et al. | 370/337 |
| 2007/0123263 A1* | 5/2007 | Smith et al. | 455/445 |

FOREIGN PATENT DOCUMENTS

WO   WO9532287 A1   11/1995

OTHER PUBLICATIONS

P. Johansson et al., "Rendezvous Scheduling in Bluetooth Scatternets" Proceedings of IEEE International Conf. on Communications, NY, NY, vol. 1, Apr. 28, 2002, pp. 318-324, XP010589509.

* cited by examiner

*Primary Examiner* — Anh-Vu Ly
(74) *Attorney, Agent, or Firm* — Larry Liberchuk

(57) ABSTRACT

A method enables a wireless device (310) to rendezvous with another wireless device (320) through a wireless network (330), where activation schedules of the wireless devices are not synchronized. The method includes determining a number of time units in each cycle of multiple communication cycles, identifying active time units in each cycle during which the first wireless device enters an active mode, and identifying inactive time units in each cycle during which the first wireless device enters an inactive mode. The sum of the active time units and the inactive time units equals the number of time units in each cycle. A first active time unit in each cycle occupies a same position in the cycle as an active time unit in a previous consecutive cycle. Also, a second active time unit in each cycle occupies a different position in the cycle than any active time unit in the previous consecutive cycle.

20 Claims, 3 Drawing Sheets

APPARATUS AND METHOD FOR ENABLING COMMUNICATIONS AMONG UNSYNCHRONIZED WIRELESS DEVICES

This patent application claims the priority benefit of U.S. Patent Application No. 60/972,435, filed on Sep. 14, 2007, the entirety of which is hereby incorporated by reference as if fully set forth herein.

This invention pertains to the field of wireless communications, and more particularly, to a wireless communication device and method of wireless communication in a network that enables wireless devices having unsynchronized activation schedules to rendezvous with one another.

Advancements continue to be made in wireless communications technology. For example, wireless local area networks (WLANs) and wireless personal area networks (WPANs) networks are becoming more common in homes and businesses. Such networks may include a variety of independent wireless electronic devices or terminals, which wirelessly communicate with one another. WLANs and WPANs may operate according to a number of different available standards, including IEEE standards 802.11 (Wi-Fi), 802.15 (Bluetooth) and 802.16 (WiMax), as well as the WiMedia Alliance Ultra-Wideband (UWB) standard.

FIG. 1 is a block diagram showing a conventional wireless network 100, such as a distributed wireless network, including multiple terminals configured to communicate with one another over exemplary WPAN 125. The wireless terminals may include any electronic devices or nodes configured to communicate with one another. For example, FIG. 1 depicts a home network in which the electronic devices include a personal computer 120, a digital television set 121, a digital camera 122 and a personal digital assistant (PDA) 123. The network 100 may also include an interface to other networks, such as modem 130, to provide connectivity of all or some of the wireless devices 120-123 to the Internet 140, for example. Of course, there are many other types of wireless networks in which electronic devices communicate with one another, including networks in manufacturing plants, medical facilities, security systems, and the like.

Further, low-power consumption of electronic devices is becoming increasing important, especially with respect to portable electronic devices limited in size and battery capacity (e.g., PDA 123). Consequently, wireless electronic devices in distributed networks often incorporate various techniques for extending battery life and otherwise reducing power consumption. For example, one particularly effective technique is to reduce the duty cycle of the electronic devices by causing them to turn off for extended periods of time, during which no communications occur. Each electronic device therefore alternates between an active mode (i.e., awake mode) and an inactive mode (i.e., sleep mode or hibernation). The time periods corresponding to the active and inactive modes are typically associated with the timing of super-frames. Super-frames include predetermined time slots for transmission/receiving frames dedicated to various information communicated over the network, including frames containing management information (e.g., beacon frames) and frames containing data.

Wireless devices in the active mode are able to communicate with one another, for example, by exchanging beacons with other devices indicating their presence and identity in the network 100. Wireless devices in the inactive mode are unable to send or receive such information. Therefore, in order to effectively communicate, wireless devices must be awake (i.e., in the active mode) at the same time. However, the wireless devices may not be able to synchronize with each other unless there is pre-coordination among them to assure that they are in the active mode at the same time. For example, devices in hibernation with different wake-up schedules may never know that the other exists.

Similarly, wireless devices may communicate using directional antennas, which extend transmission range. Wireless devices using directional antennas must align their respective antennas at the same time in order to communicate. In other words, the wireless devices must first find each other, which is accomplished by the wireless devices simultaneously scanning (e.g., sweeping their antenna beams) around surrounding areas. However, the wireless devices may not discover one another unless there is pre-coordination among them to assure that they are sweeping their antenna beams at the same time.

As a result, wireless devices may not be able to discover and communicate with each other even though they are in the same network 100 and in proximity to one another. Such coordination or synchronization is difficult and costly to implement. However, wireless devices not having a common time-domain reference point for coordinating network control or data transmission will not communicate properly as a network.

FIG. 2 is a block diagram of operational time lines 210 and 220 corresponding to two wireless electronic devices, e.g., 122 and 123, in network 100, which periodically hibernate, but have not been coordinated their the respective active periods. In FIG. 2, each time line 210, 220 includes a series of consecutive blocks, each of which represents a fixed period of time (i.e., corresponding to a super-frame). The blocks are separated into groups and numbered from 0 to 6, indicating consecutive seven block cycles. Shaded blocks indicate super-frames during which the corresponding device is inactive and white blocks indicate super-frames during which the device is active. In other words, each time line 210, 220 depicts a low duty cycle of $1/7$, meaning that the corresponding electronic devices are awake for one block (e.g., block 1) of each cycle of seven blocks (e.g., blocks 0 to 6). To achieve a duty cycle of $1/7$, each device stays awake for one block every seven blocks in a cycle.

As shown in FIG. 2, although both wireless devices are active at block 1, they do not exchange beacons and/or scan each other because their time lines are not synchronized (e.g., offset by 2 blocks). In other words, when electronic devices activate or awaken at different times, they are unable to communicate with each other. To attempt to activate at the same time, these devices may be made to wake up at a randomly-chosen blocks every 7 blocks. However, there is no guarantee that these two devices will ever do so. Similarly, when the electronic devices use directional antennas, a white block of FIG. 2 may represent a time window for neighbor discovery using directional antennas. Again, two devices must have "overlapping" white blocks in order to find each other.

Accordingly, it would be desirable to provide a wireless communication device and method of wireless communication in a wireless communication system that provides a rendezvous mechanism that enables independent devices to find and communicate with each other without having to time synchronize with each other.

In one aspect of the invention, a method is provided for enabling a first wireless device to rendezvous with at least a second wireless device through a wireless network, where activation schedules of the first wireless device and the second wireless device are not synchronized. The method includes pre-determining a number of time units in each cycle of multiple communication cycles; identifying multiple active time units in each cycle during which the first wireless device enters an active mode; and identifying multiple inactive time units in each cycle during which the first wireless device enters an inactive mode. A sum of the active time units and the inactive time units equals the number of time units in each cycle. One active time unit of the multiple active time units in each cycle occupies a same position in the cycle as an active time unit in a previous consecutive cycle. Also, another active time unit of the multiple active time units in each cycle occupies a different position in the cycle than any active time unit in the previous consecutive cycle.

The other active time unit in each cycle occupies a same position in the cycle as an active time unit in a subsequent consecutive cycle. Further, the one active time unit in each cycle occupies a different position in the cycle than any active time unit in the subsequent consecutive cycle.

Each time unit may correspond to a super-frame of the wireless network. The active time units in each cycle may consist of the one active time unit and the other active time unit. Identifying the active time units in each cycle may include applying the following equation:

$$X_{i+1}=(X_i+S) \bmod C$$

$X_i$ is a value of the one active time unit, $X_{i+1}$ is a value of the other active time unit, C is the number of time units in each cycle, and S is a constant having a value between 1 and C−1. Also, the value of $X_i$ of each cycle may be equal to the value $X_{i+1}$ of a previous consecutive cycle.

The second wireless device may determine the number of time units in each cycle of multiple communication cycles; identify multiple active time units in each cycle during which the second wireless device enters an active mode; and identify multiple inactive time units in each cycle during which the second wireless device enters an inactive mode. A sum of the active time units and the inactive time units equals the number of time units in each cycle. One active time unit of the multiple active time units in each cycle occupies a same position in the cycle as an active time unit in a previous consecutive cycle. Another active time unit of the multiple active time units in each cycle occupies a different position in the cycle than any active time unit in the previous consecutive cycle. The first wireless device is able to communicate with the second wireless device when they are simultaneously in the active mode.

The active mode may include an awake mode during which the first wireless device awakens from a hibernation state and communicates over the wireless network. The active mode may include a discovery mode during which the first wireless device performs a scan with a directional antenna for locating other directional antennas. The directional antenna scan may include sweeping an antenna beam of the directional antenna.

In another aspect of the invention, a device is provided for communicating over a wireless network. The device is configured to periodically rendezvous with at least one other device over the wireless network, where an activation schedule of the device is not synchronized with an activation schedule of the at least one other device. The device includes a memory and a processor. The memory stores a rendezvous algorithm and information identifying a number of time units in each cycle of multiple cycles. The processor determines multiple active time units in each cycle, according to the rendezvous algorithm, during which the device enters an active mode. One active time unit of the multiple active time units in each cycle occupies a same position in the cycle as an active time unit in a previous consecutive cycle. Another active time unit of the multiple active time units in each cycle occupies a different position in the cycle than any active time unit in the previous consecutive cycle. The device is in an inactive mode during multiple inactive time units of each cycle. A sum of the active time units and the inactive time units equals the number of time units in each cycle.

The rendezvous algorithm may include the following, to determine the active time units in each cycle:

$$X_{i+1}=(X_i+S) \bmod C$$

$X_i$ is a value of the one active time unit, $X_{i+1}$ is a value of the other active time unit, C is the number of time units in each cycle, and S is a constant having a value between 1 and C−1. The device may be able to communicate with the at least one other device, which also executes the algorithm, when the device and the at least one other device are simultaneously in the active mode.

The device may further include a transceiver that is powered off during the inactive mode. The active mode may include the transceiver awakening from the inactive mode and at least one of sending and receiving communications over the wireless network. The device may have a duty cycle equal to a/C, where "a" is a number greater than 1 and less than C.

The device may further include an antenna for sending and receiving communication signals over the wireless network. The active mode may include a discovery mode during which the antenna is used to locate an antenna of the at least one other device. The antenna may be a directional antenna.

In another aspect of the invention, a method is provided for enabling a first wireless device to rendezvous with a second wireless device over a wireless network, where activation schedules of the first wireless device and the second wireless device are not synchronized. The method includes determining two super-frames $[X_i, X_{i+1}]$ in each cycle of multiple communication cycles, during which the first wireless device enters an active mode, according to the following equation, in which C is a number of super-frames in each cycle and S is a constant having a value between 1 and C−1:

$$X_{i+1}=(X_i+S) \bmod C$$

Two super-frames $[X'_i, X'_{i+1}]$ are determined for each cycle during which the second wireless device enters an active mode, according to the following equation, in which S' is a constant having a value between 1 and C−1 and S' is not necessarily equal to S:

$$X'_{i+1}=(X'_i+S') \bmod C$$

The first wireless device and the second wireless device are able to at least one of locate and communicate with each other when both the first wireless device and the second wireless device are in the active mode, simultaneously.

In the following detailed description, for purposes of explanation and not limitation, example embodiments disclosing specific details are set forth in order to provide a thorough understanding of an embodiment according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known devices and methods may be omitted so as to not obscure the description of the example embodiments. Such methods and devices are clearly within the scope of the present teachings.

In the various embodiments, a time-domain based rendezvous algorithm is executed by multiple networked wireless devices, operating on low duty cycles, e.g., by periodically entering an inactive or sleep mode, or using directional antennas. The algorithm provides discovery periods, during which the wireless devices awaken and/or scan one another, in predetermined cycles. The timing of the discover periods changes from cycle to cycle. Accordingly, the wireless devices ultimately achieve overlapping active states, during which beacons, data and other communications may be exchanged and/or antennas can be properly directed, without previously coordinated time synchronization of the respective wireless devices.

Figure 3:
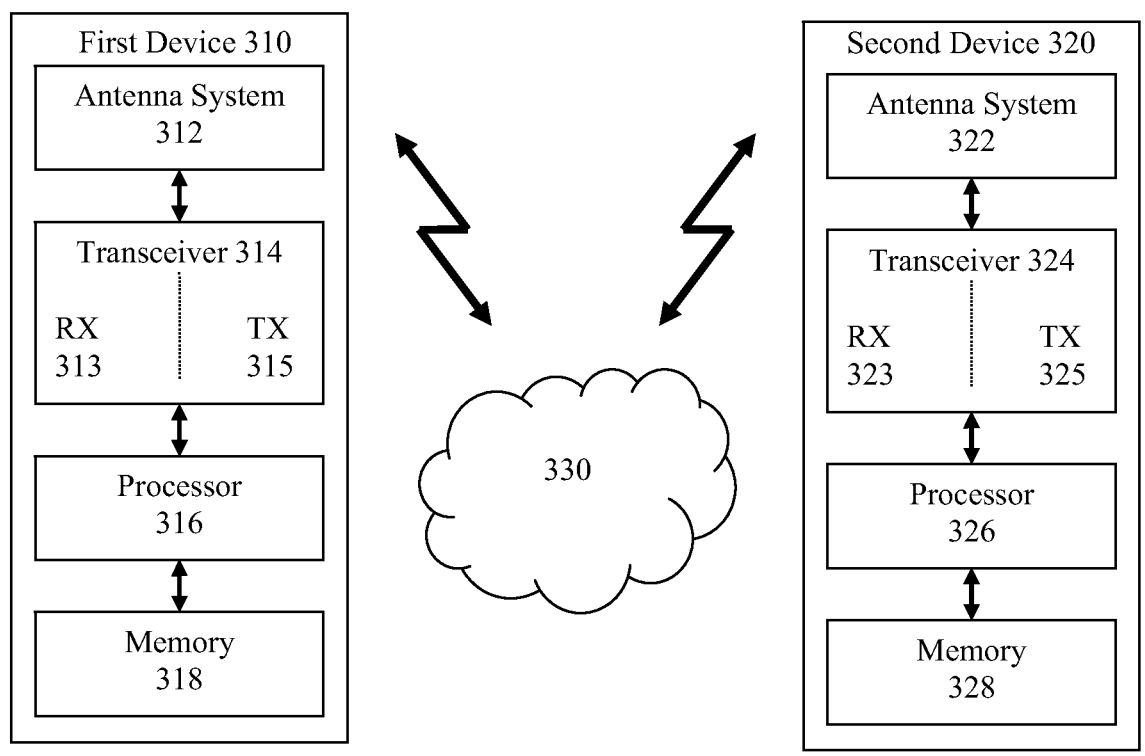
FIG. 3 is a functional block diagram of wireless devices communicating over a wireless network according to one embodiment.

FIG. 3 is a functional block diagram of representative wireless communication nodes or devices 310 and 320 configured to communicate with each other, according to an embodiment, over a wireless network 330 (e.g., WLAN or WPAN). For example, wireless network 330 may be a UWB network and wireless devices 310, 320 may be adapted to operate using a UWB protocol in accordance with WiMedia specifications. Wireless devices 310, 320 may be adapted to operate using other communications protocols, although the protocols must provide for alignment of block (timing unit) boundaries in communication streams of the devices 310 and 320, discussed below. For example, the beginning of each super-frame of device 310 is aligned with the beginning of a super-frame of device 320, even though the super-frames may be at different points in their cycles. The WiMedia UWB protocol, for example, provides such super-frame alignment, and also places management information at the beginning of each super-frame.

As will be appreciated by those skilled in the art, one or more of the various "parts" shown in FIG. 3 may be physically implemented using a software-controlled microprocessor, hard-wired logic circuits, or a combination thereof. Also, while the parts are functionally segregated in FIG. 3 for explanation purposes, they may be combined variously in any physical implementation.

Wireless device 310 includes transceiver 314, processor 316, memory 318, and antenna system 312. Transceiver 314 includes a receiver 313 and a transmitter 315, and provides functionality for wireless device 310 to communicate with other wireless devices, such as wireless device 320, over wireless communication network 330 according to the appropriate standard protocols.

Processor 316 is configured to execute one or more software algorithms, including the rendezvous algorithm of the embodiments described herein, in conjunction with memory 318 to provide the functionality of wireless device 310. Processor 316 may include its own memory (e.g., nonvolatile memory) for storing executable software code that allows it to perform the various functions of wireless device 310, discussed herein. Alternatively, the executable code may be stored in designated memory locations within memory 318.

In FIG. 3, in one embodiment, antenna system 312 may include a directional antenna system provides a capability for the wireless device 310 to select from multiple antenna beams for communicating with other wireless devices in multiple directions. For example, antenna system 312 may include multiple antennas, each corresponding to one antenna beam, or antenna system 312 may include a steerable antenna that can combine multiple different antenna elements to form a beam in different directions. Alternatively, antenna system 312 may be a non-directional or omnidirectional antenna system.

Generally, wireless device 320 may be substantially the same as wireless device 310, for ease of explanation. Accordingly, wireless device 320 includes transceiver 324, processor 326, memory 328, and antenna system 322. Transceiver 324 includes a receiver 323 and a transmitter 325, and provides functionality for wireless device 320 to communicate with other wireless devices, such as wireless device 310, over wireless communication network 330, according to the appropriate standard protocols.

Processor 326 is configured to execute one or more software algorithms in conjunction with memory 328 to provide the functionality of wireless device 320. Processor 326 may include its own memory (e.g., nonvolatile memory) for storing executable software code that allows it to perform the various functions of wireless device 320, discussed herein. Alternatively, the executable code may be stored in designated memory locations within memory 328.

Antenna system 322 may include a directional antenna system and provide a capability for the wireless device 320 to select from multiple antenna beams for communicating with other wireless devices (e.g., wireless device 310) in multiple directions. Alternatively, antenna system 322 may be a non-directional or omnidirectional antenna system. When both antenna system 312 of wireless device 310 and antenna system 322 of wireless device 320 are directional antenna systems, the antennas must be aligned in order for wireless devices 310 and 320 to discover and communicate with one another.

In the discussion to follow, an exemplary embodiment is described for a method that enables wireless devices, such as representative wireless devices 310, 320, in a distributed network to rendezvous, e.g., for purposes of discovering one another, exchanging information and/or aiming antennas, without synchronizing time schedules. For example, the wireless devices 310, 320 may be low duty cycle devices which periodically enter and awaken from a sleep mode according to respective time schedules. The exemplary embodiments enable the wireless devices 310, 320 to awaken at the same time without pre-coordinating synchronization of their respective schedules. Examples are provided for illustration purposes and are not to be construed as limiting the scope of the teachings of this specification, or the claims to follow.

Figure 1:
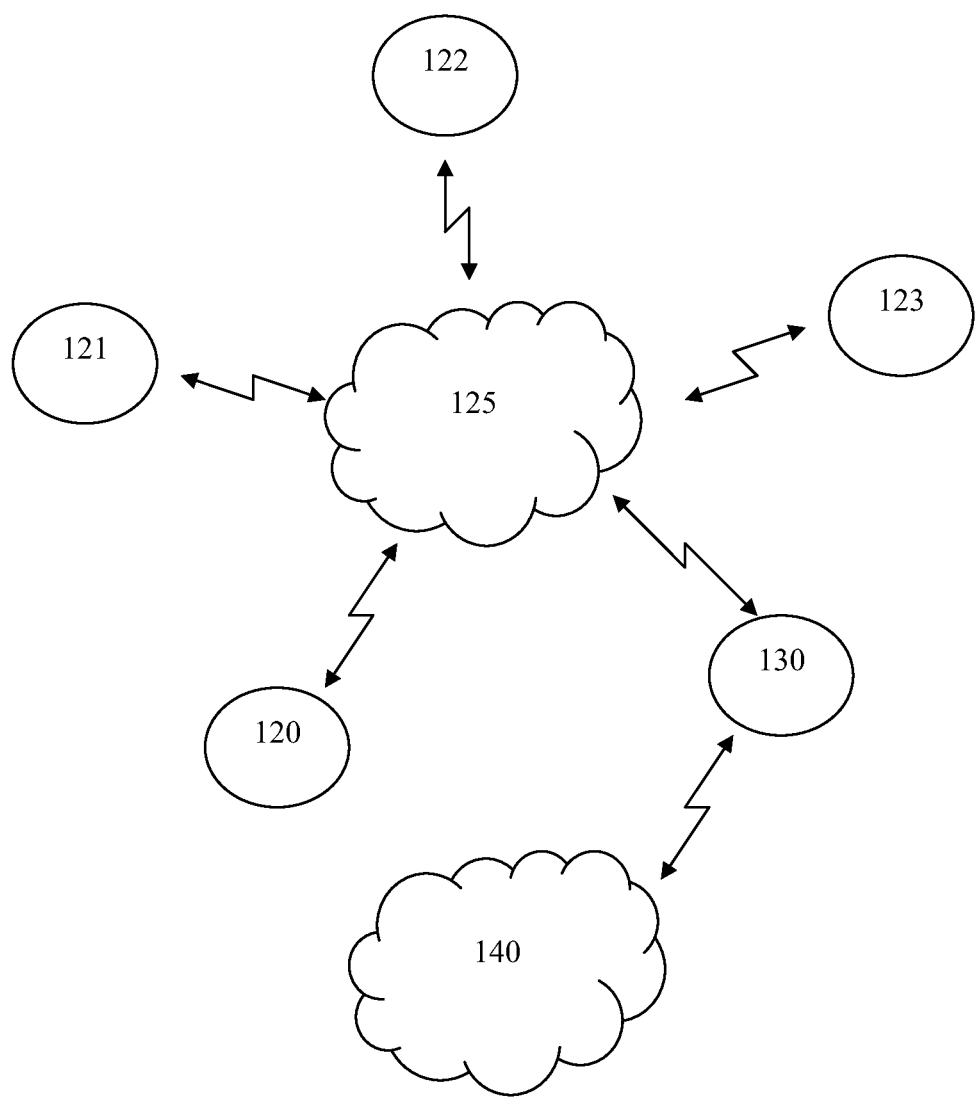
FIG. 1 is a block diagram of a conventional wireless communications network.
Figure 2:
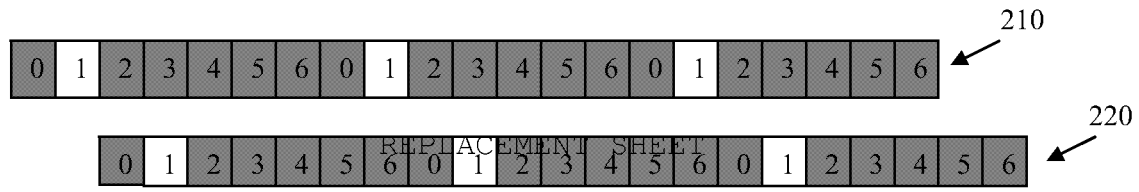
FIG. 2 is a block diagram of conventional time lines for communication by wireless devices in a conventional wireless communications network.
Figure 4:
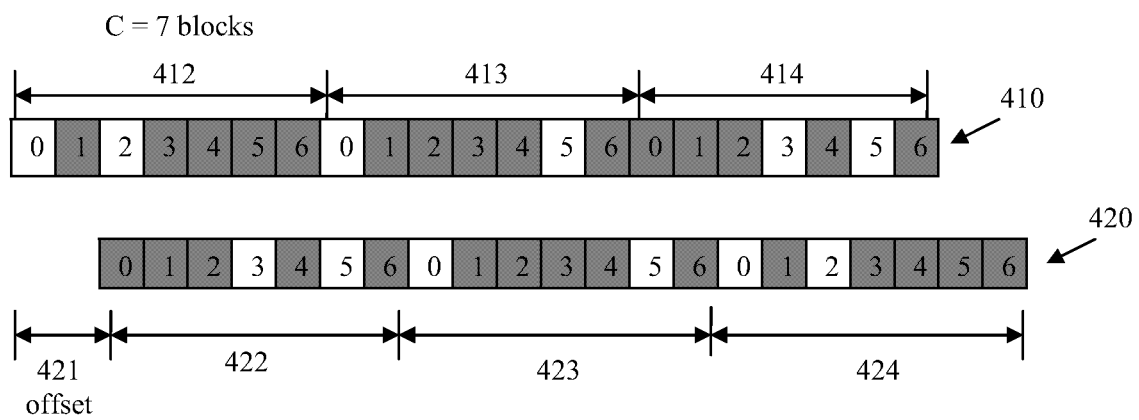
FIG. 4 is a block diagram of time lines for communication by unsynchronized wireless devices in a wireless network according to one embodiment.

FIG. 4 is a block diagram of operational time lines 410 and 420 respectively corresponding, for example, to wireless devices 310 and 320 of FIG. 3, according to one embodiment. The active periods of wireless devices 310, 320 have not been pre-coordinated or otherwise synchronized. In FIG. 4, each time line 410, 420 includes a series of consecutive blocks, each of which represents a fixed period of time. The fixed period of time may correspond to a super-frame, although this is not necessary. For example, each period of time (block) may correspond to multiple super-frames or a portion of a super-frame, or may be entirely independent of super-frames.

Each time line 410, 420 is also divided into a cycles, depicted by groups of blocks numbered 0 to 6. For example, time line 410 is divided into cycles 412, 413 and 414, and time line 420 is divided into cycles 422, 423 and 424. Each of the cycles 412-414 and 422-424 in turn includes C blocks, where C is a prime number. FIG. 4, in particular, shows an exemplary embodiment in which each cycle 412-414 and 422-424 is divided into seven blocks (i.e., C=7). However, in other embodiments, C can be a different numerical value.

The length of time of each block and/or cycle can be adjusted to provide unique benefits for any particular situation or to meet various design requirements. For example, when a specific duty cycle is desired, the number of blocks in the cycle must be adjusted accordingly, knowing that the corresponding wireless device 310, 320 will enter the active mode at least twice within each cycle, as discussed below. Therefore, to achieve a duty cycle of about ⅕, for example, C must be set to equal 11 (C=11), so that each wireless device 310, 320 is awake 2 out of every 11 blocks (i.e., making the duty cycle about ⅕). In general, the duty cycle of wireless device 310, 320 is a/C, where "a" is a number greater than 1 and less than C.

As shown in FIG. 4, in each time line 410, 420, shaded blocks indicate time periods (e.g., super-frames) during which the corresponding wireless devices 310, 320 are inactive (e.g., asleep and/or not sweeping directional antenna beams, etc.) and white blocks indicate time periods during which wireless devices 310, 320 are active (e.g., awake and/or sweeping directional antenna beams, etc.). Accordingly, FIG. 4 shows that each wireless device 310, 320, corresponding to time lines 410, 420, enters an active state for two blocks during each cycle C.

The blocks during which the corresponding wireless devices 310, 320 are active are determined by a sequence, $X_i$, such that a set of super-frames $[X_i, X_{i-1}]$ are identified during each cycle $C_i$, according to the following equation:

$$X_{i+1} = (X_i + S) \bmod C$$

As discussed above, C is a prime number indicating groupings of super-frames, or other unit blocks of time. S is a seed value, which is constant number that may be randomly selected from numbers in the range of 1 to C−1. The initial value of X (i.e., $X_0$), which is included in the initial cycle (i.e., $C_0$), can be any number in the range of 0 to C−1. As stated above, according to an embodiment, when the time lines 410, 420 are divided into multiple sets of C blocks, each corresponding wireless device 310, 320 enters an active mode (e.g., wakes up) at $X_i$th and $X_{i+1}$th blocks during the ith set of C blocks.

For example, referring to FIG. 4, for wireless device 310 corresponding to time line 410, $X_0$=2 and S=5 (chosen randomly), and for wireless device 320 corresponding to time line 420, $X_0$=3 and S=2 (chosen randomly). Both time lines 410 and 420 have the same cycle, which is set at C=7 in the present example. The rendezvous algorithm and corresponding values may be stored, for example, in memories 318, 328 and executed by processors 316, 326 of wireless devices 310, 320, respectively.

Accordingly, by way of example, the values $[X_i, X_{i+1}]$ of the first cycle 412 ($C_0$) of time line 410 are $[X_0, X_1]$, where $X_1$ is calculated as follows:

$$X_1 = (X_0 + S) \bmod C$$

$$X_1 = (2+5) \bmod 7$$

$$X_1 = 7 \bmod 7 =$$

$$X_2 = 0$$

Therefore, wireless device 310 is active during blocks 2 and 0, respectively corresponding to $X_0$ and $X_1$, during the first cycle 412. Likewise, the values $[X_i, X_{i+1}]$ of the second cycle 413 ($C_1$) are $[X_1, X_2]$, where $X_2$ is calculated as follows:

$$X_2 = (X_1 + S) \bmod C$$

$$X_2 = (0+5) \bmod 7$$

$$X_2 = 5 \bmod 7$$

$$X_2 = 5$$

Therefore, the first wireless device 310 is active during super-frames 0 and 5, respectively corresponding to $X_1$ and $X_2$, during the second cycle 413. The subsequent values of X in time line 410, as well as the values of X in time line 420 are determined in the same manner.

Accordingly, using the exemplary values above, the activation sequences per cycle for wireless devices 310, 320 are respectively calculated to be [2, 0], [0, 5], [5, 3], [3, 1], [1, 6] and [6, 4] in time line 410 and [3, 5], [5, 0], [0, 2], [2, 4], [4, 6] and [6, 1] in time line 420. In other words, as shown in FIG. 4, wireless device 310 enters the active mode during blocks 0 and 2 of cycle 412, block 0 and 5 of cycle 413 and blocks 3 and 5 of cycle 414 of time line 410, while wireless device 320 enters the active mode during blocks 3 and 5 of cycle 422, blocks 0 and 5 of cycle 423 and blocks 0 and 2 of cycle 424 of time line 420.

Thus, by mutually executing the algorithm, the wireless devices 310, 320 are simultaneously active at block 0 of cycle 413 of time line 410 and block 5 of cycle 422 of time line 420. Wireless devices 310, 320 may therefore rendezvous during that period of time, for example, exchanging beacons or data, discovering each other's positions and/or aiming directional antennas accordingly. This is accomplished without synchronization. Also, wireless devices 310, 320 do not require knowledge of the values of $X_0$ and/or S used by the other.

Further, since the two wireless devices 310, 320 are not time synchronized, the beginning of time line 410 and time line 420 may not be aligned (although the block boundaries are aligned), as indicated by offset 421. However, due to the flexibility of the algorithm, the wireless devices 310, 320 will ultimately enter the active mode at the same time for at least one block regardless of the value of the offset. Therefore, wireless devices 310, 320 also do not require knowledge of the existence or value of offset 421.

Accordingly, wireless devices are able to rendezvous (e.g., discover and/or communicate) with one another without being time synchronized with each other. This approach can be applied, for example, to coordinate or re-coordinate power-saving devices awakening from hibernation, to assist devices using directional antennas in locating each other, and to provide certain coordination among wireless devices operating on non-orthogonal channels.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

The invention claimed is:

1. A method of enabling a first wireless device to rendezvous with at least a second wireless device through a wireless network, where activation schedules of the first wireless device and the second wireless device are not synchronized, the method comprising:
   pre-determining by the first wireless device a number of time units in each cycle of a plurality of communication cycles;
   creating an activation sequence having a plurality of active time units in each cycle during which the first wireless device enters an active mode and a plurality of inactive time units in each cycle during which the first wireless device enters an inactive mode, a sum of the plurality of active time units and the plurality of inactive time units equaling the number of time units in each cycle; and controlling the creating such that a first active time unit of the plurality of active time units in each cycle occupies a same position in the cycle as an active time unit in a previous consecutive cycle, and a second active time unit of the plurality of active time units in each cycle occupies a different position in the cycle than any active time unit in the previous consecutive cycle.

2. The method of claim 1, wherein the second active time unit of the plurality of active time units in each cycle occupies a same position in the cycle as an active time unit in a subsequent consecutive cycle.

3. The method of claim 2, wherein the first active time unit of the plurality of active time units in each cycle occupies a different position in the cycle than any active time unit in the subsequent consecutive cycle.

4. The method of claim 1, wherein each time unit corresponds to a super-frame of the wireless network.

5. The method of claim 4, wherein the plurality of active time units in each cycle consists of the first active time unit and the second active time unit.

6. The method of claim 5, wherein creating the activation sequence having the plurality of active time units in each cycle comprises applying the following equation:

$$X_{i+1}=(X_i+S) \bmod C$$

wherein $X_i$ is a value of the first active time unit, $X_{i+1}$ is a value of the second active time unit, i is an integer, C is the number of time units in each cycle, and S is a constant having a value between 1 and C−1.

7. The method of claim 6, wherein the value of $X_i$ of each cycle is equal to the value $X_{i+1}$ of a previous consecutive cycle.

8. The method of claim 1, wherein the second wireless device:

determines the number of time units in each cycle of a plurality of communication cycles;

creates an activation sequence having a plurality of active time units in each cycle during which the second wireless device enters an active mode and a plurality of inactive time units in each cycle during which the second wireless device enters an inactive mode, a sum of the plurality of active time units and the plurality of inactive time units equaling the number of time units in each cycle, wherein the creating by the second wireless device provides one of the plurality of active time units in each cycle occupying a same position in the cycle as an active time unit in a previous consecutive cycle, and another active time unit of the plurality of active time units in each cycle occupies a different position in the cycle than any active time unit in the previous consecutive cycle.

9. The method of claim 8, wherein the first wireless device is able to communicate with the second wireless device when they are simultaneously in the active mode.

10. The method of claim 1, wherein the active mode comprises an awake mode during which the first wireless device awakens from a hibernation state and communicates over the wireless network.

11. The method of claim 1, wherein the active mode comprises a discovery mode during which the first wireless device performs a scan with a directional antenna for locating other directional antennas.

12. The method of claim 11, wherein the directional antenna scan comprises sweeping an antenna beam of the directional antenna.

13. A device for communicating over wireless network, configured to periodically rendezvous with at least one other device over the wireless network, where an activation schedule of the device is not synchronized with an activation schedule of the at least one other device, the device comprising:

a memory for storing a rendezvous algorithm and information identifying a number of time units in each cycle of a plurality of cycles; and a processor for creating an activation sequence having a plurality of active time units in each cycle, according to the rendezvous algorithm, during which the device enters an active mode, the activation sequence having a first active time unit of the plurality of active time units in each cycle occupy a same position in the cycle as an active time unit in a previous consecutive cycle, and a second active time unit of the plurality of active time units in each cycle occupy a different position in the cycle than any active time unit in the previous consecutive cycle, wherein the device is in an inactive mode during a plurality of inactive time units of each cycle, a sum of the plurality of active time units and the plurality of inactive time units equaling the number of time units in each cycle.

14. The device of claim 13, wherein the rendezvous algorithm comprises the following, to determine the plurality of active time units in each cycle:

$$X_{i+1}=(X_i+S) \bmod C$$

wherein $X_i$ is a value of the first active time unit, $X_{i+1}$ is a value of the second active time unit, i is an integer, C is the number of time units in each cycle, and S is a constant having a value between 1 and C−1.

15. The device of claim 14, further comprising:

a transceiver that is powered off during the inactive mode, wherein the active mode comprises the transceiver awakening from the inactive mode and at least one of sending and receiving communications over the wireless network.

16. The device of claim 15, wherein the device has a duty cycle equal to a/C, where a is a number greater than 1 and less than C.

17. The device of claim 14, further comprising:

an antenna for sending and receiving communication signals over the wireless network, wherein the active mode comprises a discovery mode during which the antenna is used to locate an antenna of the at least one other device.

18. The device of claim 17, wherein the antenna comprises a directional antenna.

19. The device of claim 14, wherein the device is able to communicate with the at least one other device, which also executes the algorithm, when the device and the at least one other device are simultaneously in the active mode.

20. A method of enabling a first wireless device to rendezvous with a second wireless device over a wireless network, where activation schedules of the first wireless device and the second wireless device are not synchronized, the method comprising:

determining two super-frames $[X_i, X_{i+1}]$ in each cycle of a plurality of communication cycles, during which the first wireless device enters an active mode, according to the following equation, in which i is an integer, C is a number of super-frames in each cycle and S is a constant having a value between 1 and C−1:

$$X_{i+1}=(X_i+S) \bmod C,$$

and determining two super-frames [$X'_i$, $X'_{i+1}$] for each cycle during which the second wireless device enters an active mode, according to the following equation, in which S' is a constant having a value between 1 and C−1 and S' is not necessarily equal to S:

$$X'_{i+1} = (X'_i + S') \bmod C,$$

wherein the first wireless device and the second wireless device are able to at least one of locate and communicate with each other when both the first wireless device and the second wireless device are in the active mode simultaneously.

* * * * *